United States Patent
Divakara et al.

(10) Patent No.: US 9,852,593 B2
(45) Date of Patent: Dec. 26, 2017

(54) METHOD OF IMPLEMENTING GPS BASED EXTENDED CHIME AND SPECIAL ESCORT MODE IN SECURITY PANEL

(71) Applicant: Honeywell International Inc., Morristown, NJ (US)

(72) Inventors: Manjunatha Divakara, Tumkur (IN); Balamurugan Ganesan, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 111 days.

(21) Appl. No.: 14/747,000

(22) Filed: Jun. 23, 2015

(65) Prior Publication Data

US 2016/0379454 A1   Dec. 29, 2016

(51) Int. Cl.
| | | |
|---|---|---|
| G08B 1/08 | (2006.01) | |
| G08B 13/00 | (2006.01) | |
| G08B 21/02 | (2006.01) | |
| G08B 3/10 | (2006.01) | |
| H04M 1/725 | (2006.01) | |
| H04W 4/02 | (2009.01) | |
| G08B 25/14 | (2006.01) | |
| G08G 1/00 | (2006.01) | |

(52) U.S. Cl.
CPC ............ *G08B 13/00* (2013.01); *G08B 3/10* (2013.01); *G08B 21/0261* (2013.01); *G08B 21/0269* (2013.01); *H04M 1/72541* (2013.01); *H04W 4/021* (2013.01); *G08B 21/0283* (2013.01); *G08B 25/14* (2013.01); *G08G 1/207* (2013.01)

(58) Field of Classification Search
CPC ....... B60R 25/00; A61B 5/04; G08B 21/0233; G08B 21/0415; G08B 21/0269; G08B 13/2402; A01K 15/023; A01K 15/021; G01S 5/0027; G01S 5/0072
USPC ...... 340/539.13, 539.12, 568.1, 517, 870.07, 340/572.1; 342/357.55, 357.48, 451
See application file for complete search history.

(56) References Cited

U.S. PATENT DOCUMENTS

| | | | |
|---|---|---|---|
| 7,221,928 B2* | 5/2007 | Laird ................ | A61B 5/04 340/539.12 |
| 8,116,724 B2 | 2/2012 | Peabody | |
| 8,531,294 B2* | 9/2013 | Slavin ............... | G08B 13/2402 340/539.13 |
| 9,030,316 B2* | 5/2015 | Libal .................. | G08B 25/008 340/517 |
| 2006/0255935 A1* | 11/2006 | Scalisi ................ | B60R 25/00 340/539.13 |

(Continued)

OTHER PUBLICATIONS

Extended European search report from corresponding EP patent application 16173578.2, dated Sep. 16, 2016.

*Primary Examiner* — Hoi Lau

(74) *Attorney, Agent, or Firm* — Husch Blackwell LLP

(57) ABSTRACT

A system is provided that includes a security system that protects a secured geographic area, a geographic location outside of the secured area of an authorized human user of the security system saved in a memory of the security system, and a processor of the security system that tracks activity of the authorized user by geographic location outside of the secured area and generates an alert upon detecting that a difference between the tracked geographic location of the authorized user and saved location exceeds a threshold value.

10 Claims, 3 Drawing Sheets

(56) References Cited

U.S. PATENT DOCUMENTS

| | | | |
|---|---|---|---|
| 2007/0273514 A1* | 11/2007 | Winand | B64F 1/366 340/572.1 |
| 2008/0207218 A1 | 8/2008 | Craine et al. | |
| 2009/0009397 A1* | 1/2009 | Taylor | G01C 21/206 342/451 |
| 2009/0009398 A1* | 1/2009 | Taylor | G01S 5/0072 342/451 |
| 2009/0267829 A1* | 10/2009 | Mitchell | G01S 5/0027 342/357.48 |
| 2009/0289844 A1* | 11/2009 | Palsgrove | A01K 15/021 342/357.55 |
| 2010/0139576 A1* | 6/2010 | Kim | A01K 15/023 119/721 |
| 2010/0225469 A1* | 9/2010 | Yoshioka | G08B 21/0233 340/539.13 |
| 2010/0289644 A1* | 11/2010 | Slavin | G08B 13/2402 340/568.1 |
| 2014/0118149 A1 | 5/2014 | Elias | |
| 2015/0156567 A1* | 6/2015 | Oliver | H04Q 9/00 340/870.07 |
| 2015/0279187 A1* | 10/2015 | Kranz | G08B 21/0415 340/539.12 |
| 2016/0106174 A1* | 4/2016 | Chung | A42B 3/0453 340/539.13 |
| 2016/0155311 A1* | 6/2016 | Tsai | G08B 21/0269 340/539.13 |

\* cited by examiner

METHOD OF IMPLEMENTING GPS BASED EXTENDED CHIME AND SPECIAL ESCORT MODE IN SECURITY PANEL

FIELD

This application relates to security systems and more particularly, to methods of protecting users outside of secure areas.

BACKGROUND

Systems are known to protect people and assets within secured areas. Such systems are typically based upon the use of one or more wireless sensors that detect threats within the secured areas.

Threats to people and assets may originate from any of a number of different sources. For example, a fire may kill or injure occupants who have become trapped by a fire in a home. Similarly, carbon monoxide from a fire may kill people in their sleep.

Alternatively, an unauthorized intruder, such as a burglar, may present a threat to assets within an area. Intruders have also been known to injure or kill people living within the area.

In the case of intruders, sensors may be placed in different areas based upon the respective uses of those areas. For example, if people are present during some portions of a normal day and not at other times, then sensors may be placed along a periphery of a space to provide protection while the space is occupied while additional sensors may be placed within an interior of the space and used when the space is not occupied.

In most cases, threat sensors are connected to a local control panel. In the event of a threat detected via one of the sensors, the control panel may sound a local audible alarm. The control panel may also send a signal to a central monitoring station.

While conventional security systems work well, it is sometimes difficult to protect authorized users of a secured area outside the secured area. Accordingly, a need exists for better methods and an apparatus for protecting people associated with secured areas.

DETAILED DESCRIPTION

Figure 1:
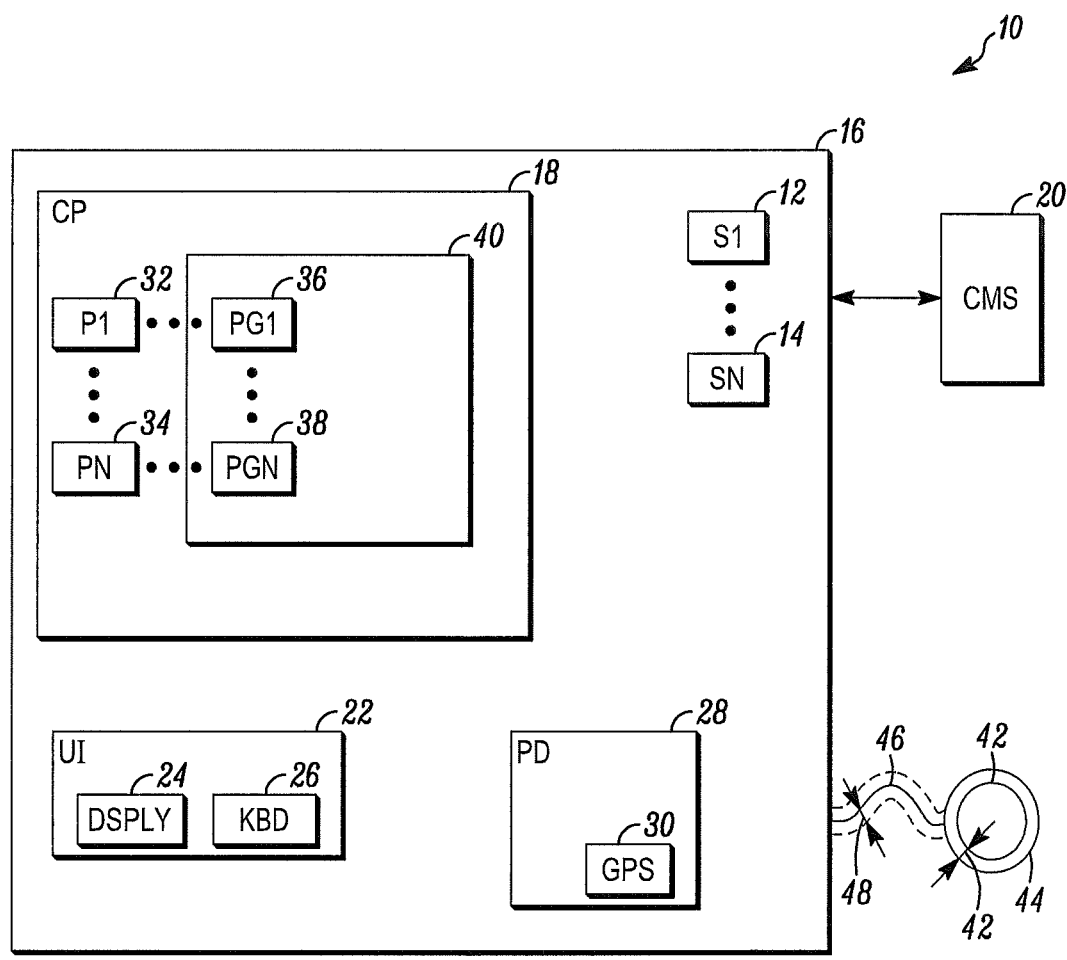
FIG. 1 illustrates a block diagram of a security system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

FIG. 1 depicts a security system 10 shown generally in accordance with an illustrated embodiment. Included within the system are a number of threat sensors 12, 14 that detect threats within a secured geographic area 16. The threat sensors may be embodied under any of a number of different formats. For example, some of the threat sensors may be switches placed on the doors and/or windows providing entrance into and egress from the secured area and that are intended to detect intruders. Other of the sensors may be passive infrared (PIR) sensors or television cameras placed within the interior to detect intruders who have been able to circumvent the sensors along the periphery.

Still other of the sensors may be environmental sensors. In this case, the sensors may be fire, smoke, or toxic gas detectors.

The sensors may be monitored by a control panel 18 either located within the secured area as shown in FIG. 1, or located elsewhere. Upon detecting activation of one of the sensors, the control panel may send an alarm message to a central monitoring station 20. The central monitoring station may respond by summoning the appropriate help (e.g., police, fire department, etc.).

The security system may be armed and disarmed via a control panel 22. In order to arm or disarm the system, an authorized human user may enter a personal identification number (PIN) through a keyboard 26 of a user interface along with a function key (e.g., arm, disarm, etc.). In response, a status of the security system is shown on a display 24.

Also included within the security system is a portable wireless device 28 carried by an authorized user of the security system. The portable device includes a locating device (e.g., a GPS device) 30 that periodically determines and reports the geographic location of the user to the control panel.

Present within the control panel, the user interface and the portable device may be one or more processor apparatus (processors) 32, 34 each operating under control of one or more computer programs 36, 38 loaded from a non-transitory computer readable medium (memory) 40. As used herein, reference to a step performed by a program is also reference to the processor that executed that step.

For example, an alarm processor within the control panel may monitor the sensors. Upon detecting activation of one of the sensors, the processor composes an alarm message for transmission to the central monitoring station. The message may include an identifier of the security system (e.g., an account number, address, etc.), an identifier of the activated sensor, an identifier of the type of activated sensor (e.g., fire, smoke, toxic gas, etc.), and a time.

Similarly, a status processor may establish an operating mode of the security system (e.g., armed, armed away, disarmed, etc.) based upon instructions received through the user interface. Once armed, the status processor enables the alarm processor to send alarm messages to the central monitoring station.

Under one illustrated embodiment, a travel monitoring process (and processor) operates in the background to provide additional protection to authorized human users in the event that an authorized user must travel outside of the secured area. Under the embodiment, the travel processor may monitor the keyboard of the user interface for entry of a geographic identifier of a destination 42. The identifier may be an address or a local or regional identifier (e.g., a name of a city, a regional airport, etc.). In response to entry of the destination, the travel processor monitors the geographic activity of the authorized user with respect to the travel destination and notifies other authorized users through the user interface or at the intended destination upon detecting any suspicious activity.

The travel processor forms a communications connection with a location processor within the portable device. The location processor periodically retrieves geographic coordinates of the portable device and reports those coordinates to the travel processor. The travel processor compares the received coordinates of the portable device with the entered (saved) coordinates of the destination and, upon detecting a difference, generates an alert. The alert may be in the form of an audio message (e.g., a chime) that periodically repeats (e.g., every 10 seconds) until acknowledged by a user.

Under another illustrated embodiment, the generation of the alert may be conditioned upon a threshold value 42. In this regard, the threshold value may be a predetermined distance outside the area of the destination that the user must cross before the alert is generated.

Under the embodiment, the destination may be defined by a set of geographic coordinates that define a periphery of an area of the destination (e.g., a city, college campus, etc.). Adding the threshold value to the set of coordinates provides a buffer defined by using another set of coordinates 44 that, if crossed by the user, results in generation of the alert. The threshold (as with the travel destination) may be entered by the authorized user through the user interface.

Under another illustrated embodiment, the travel destination may be associated with a time frame, including a beginning time and an ending time. Under this embodiment, alerts are not generated until after the start time and are not generated after the ending time.

Under another illustrated embodiment, the authorized user may enter a travel route 46 from the secured area to the travel destination. The travel route may also be associated with a threshold distance 48 on each side of the travel route. The distance on either side of the route defines a travel corridor between the secured area and travel destination. The threshold value from the travel route (i.e., the travel corridor) allows the user traveling in a car, for instance, to exit an expressway for gasoline without triggering an alert.

The system of FIG. 1 offers a number of advantages over conventional systems. For example, currently available security panels installed in the field provide personal safety to individuals through the use of panic keys available on a panel inside the secured area. Such panels also provide a facility to monitor entry/exit at home through a chime available through the panel where the panel provides an audible chime when a fault is detected at the entries/exits of perimeter zones. However, conventional security panels won't provide any personal safety alerts when individuals are outside their home, either at school, at a hostel, or traveling. In contrast, the system of FIG. 1 solves these types of problems by providing for the personal safety for individuals residing or traveling away from home and/or escorting other people who are traveling.

The system of FIG. 1 solves at least two important problems related to the personal safety of individuals. For example, the system provides a mechanism to determine whether the individual is at a place where he/she is intended to be staying while away from home. The system also provides a way to predict whether something unusual is observed in the place where individuals are staying. In any of these cases where anomalies are observed, the system is configured to raise one or more alerts directed to the attention of personal care takers and available emergency response teams in the area of the destination. This feature is referred to as the "Extended Chime Mode" of the control panel.

The system also provides protection while individuals are traveling. For example, the system provides a way to identify the location of individuals traveling along an intended path so that the individual reaches the intended destination safely and on time. If there is any deviation detected, then alerts are raised that attract the attention of personal care takers and available emergency response teams. This feature is referred to as the "Special Escort Mode" of the control panel.

In general, many prior art systems operate on the concept that individuals will use a panic button when they are in a panic situation to summon help. However, in many scenarios, the control panel of the security system may not be close by, and it may not be possible for individuals to press any keys/buttons. The system of FIG. 1 does not require the use of panic buttons or other input other than the identification of a predetermined destination.

Figure 2:
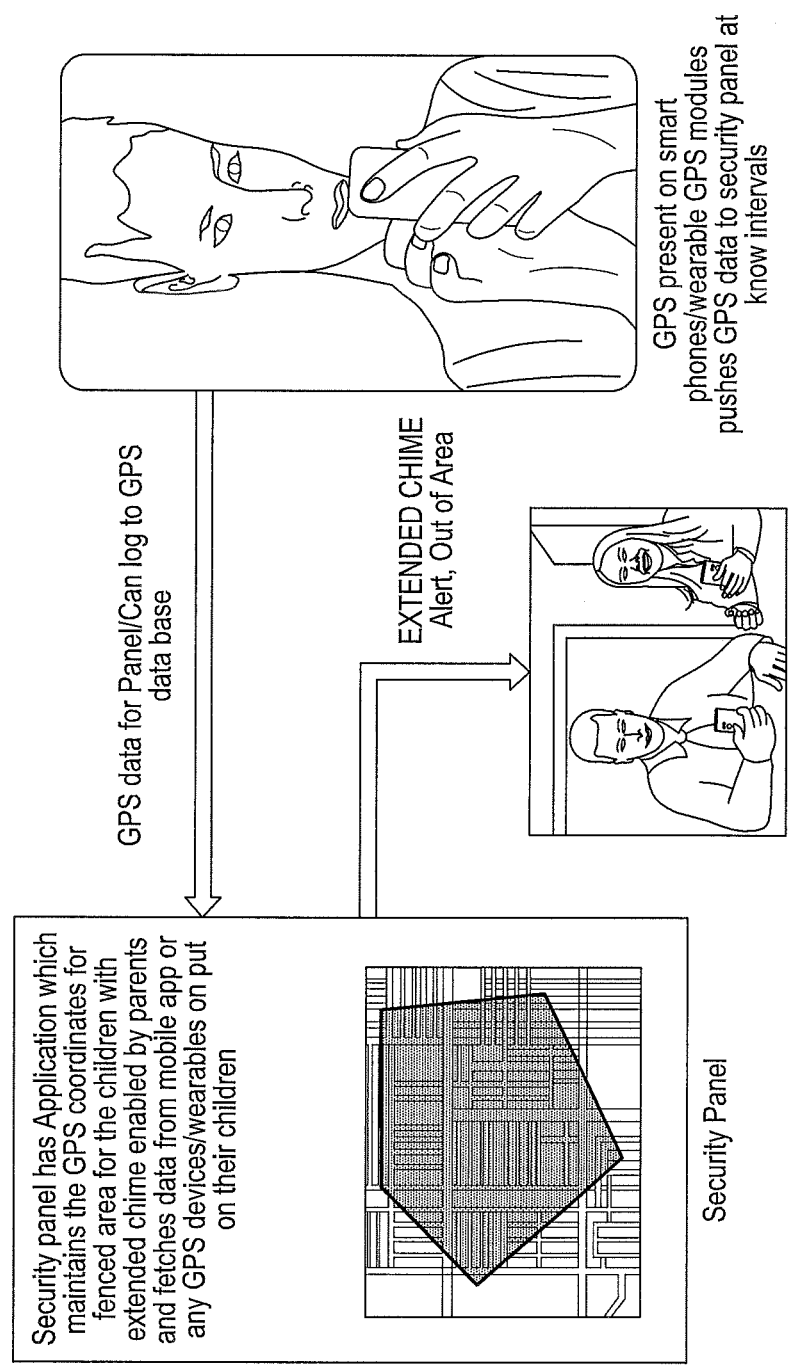
FIG. 2 illustrates a first mode of protecting a user at a destination using the system of FIG. 1.

The system of FIG. 1 has an application (app) that monitors and reports on the GPS location of a selected individual. The individual may carry or wear a GPS device. In this regard, any of a number of GPS wearable devices are available, such as smart watches or any smart phone with a GPS feature. When the extended chime mode is activated in the panel, as shown in FIG. 2, the panel will ask the individual or a facility manager to choose the intended locality of the stay when the selected individual is staying away from home. The individual/a panel user can choose the location based on his/her intended plan by selecting an area on a map that is provided by a security application running on the panel, as shown on FIG. 2. The user may trace the outline of the destination on the map that is detected by a map processor and saved into memory.

The extended chime mode can be used by individuals who are staying away from home, such as driving age children staying in hotels or hostels. The panel can detect when the received GPS data has not changed for an inordinate amount of time. This could indicate that something is wrong. The detection of this situation may result in the issuance of an extended chime alert.

The system can be used in the case of a residential school to monitor the location of children staying within a campus of the school. Any deviations can result in an alert.

Alternatively, the geographic activity of a child can be monitored via a GPS log maintained by a logging processor within the security system. Parents can view GPS logs captured in the panel in order to monitor their children's locations when they are staying away from home. The GPS logs and alerts can be used for any diagnostic purpose.

Figure 3:
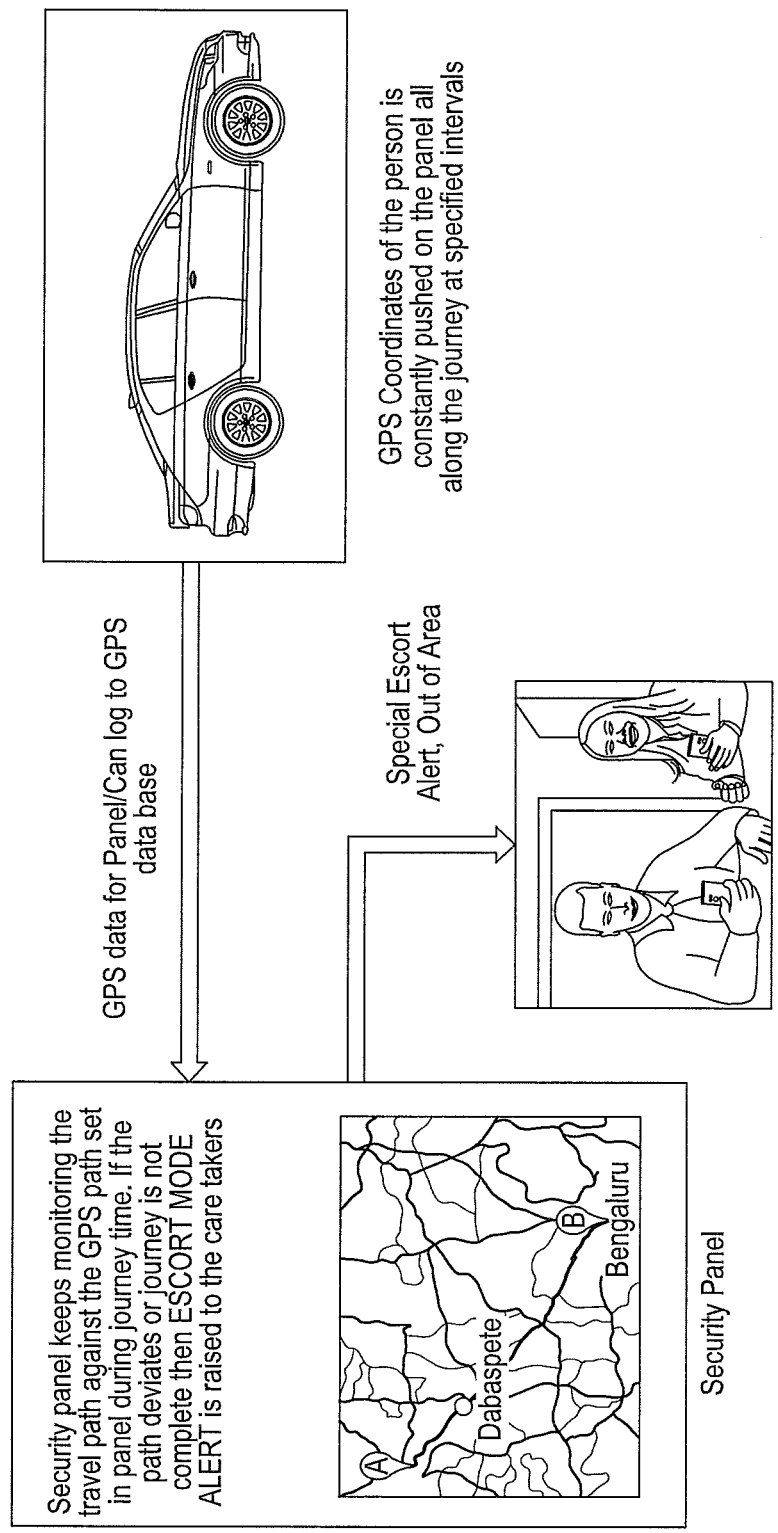
FIG. 3 illustrates a second mode of traveling using the system of FIG. 1.

The use of the special escort mode is shown in FIG. 3. Here, the control panel also has an application that monitors the GPS-based location of the individual. As above, the individual carries or wears the GPS device. As above, any of a number of GPS wearable devices may be used, such as smart watches or any smart phone with a GPS feature. When the special escort mode is activated through the panel, the panel asks an end user to choose a path of travel, the destination location, and a care taker telephone number. Thereafter, the panel keeps matching the GPS location of the individual against the chosen path of travel saved in the control panel. An alert is raised under any of a number of different conditions. For example, if the path chosen deviates from the planned route, then an alert is issued. Similarly, if the GPS location of the individual does not change for an extended period, then an alert is issued. If the GPS destination of the individual is not reached after a predetermined length of time, then an alert is issued.

The system can be used in any of a number of different situations. For example, the system can be used by people who travel using cab services or by individual who travel at night. The system can be used by individuals whose travel path extends through some remote areas where the crime rate is high.

In general, the system includes a security system that protects a secured geographic area, a geographic location outside of the secured area of an authorized human user of the security system saved in a memory of the security system, and a processor of the security system that tracks activity of the authorized user by geographic location outside of the secured area and generates an alert upon detecting that a difference between the tracked geographic location of the authorized user and saved location exceeds a threshold value.

Alternatively, the system includes a security system that protects a secured geographic area, a portable wireless device carried by an authorized user of the secured area that periodically reports the user's geographic location to the security system, a geographic location of the user outside of the secured area saved in a memory of the security system, and a processor of the security system that tracks the geographic activity and location of the user outside of the secured area and generates an alert upon detecting that a difference between the tracked geographic location and saved location exceeds a threshold value.

Alternatively, the system includes a security system having a plurality of threat sensors that protect a secured geographic area, a portable wireless device carried by an authorized user of the secured area having a global positioning device that periodically reports the user's geographic location to the security system, a set of geographic coordinates saved in a memory of the security system that defines a predefined area of the user outside of the secured area, and a processor of the security system that tracks the geographic location of the user outside of the secured area and that generates an audible alert through a control panel of the security system upon detecting the portable device outside the predefined area.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be from the described flows, and other components may be added to or removed from the described embodiments.

The invention claimed is:

1. An apparatus comprising:
a security system that protects a secured geographic area;
a control panel of the security system;
a user interface of the control panel that receives a geographic location destination located outside of the secured geographic area and saves the geographic location destination in a memory of the security system;
a portable wireless device that reports a current geographic location of the portable wireless device to the control panel; and
a processor of the security system that generates an alert upon detecting a difference between the current geographic location and the geographic location destination exceeding a predetermined threshold value,
wherein the control panel sends the alert to emergency services located in an area proximate to the geographic location destination.

2. The apparatus as in claim 1 wherein the portable wireless device is one of a wearable device or a smartphone.

3. The apparatus as in claim 1 wherein the processor generates the alert upon failing to detect any significant changes in the current geographic location for a predetermined time period.

4. The apparatus as in claim 1 wherein the user interface receives an estimated time of entry into the geographic location destination and an estimated time of departure from the geographic location destination.

5. The apparatus as in claim 4 wherein the geographic location destination includes a travel corridor defined by a path between the secured geographic area and the geographic location destination.

6. The apparatus as in claim 5 wherein the predetermined threshold value includes a predetermined lateral distance from a center of the travel corridor.

7. The apparatus as in claim 6 wherein the geographic location destination includes a geographic portion of the travel corridor that changes with time based upon an estimated speed of travel from the secured geographic area to the geographic location destination.

8. The apparatus as in claim 7 wherein the processor logs the current geographic location over a period of time and plots the current geographic location over the period of time on a map as a travel route.

9. The apparatus as in claim 1 wherein the alert includes an audible chime at the control panel.

10. The apparatus as in claim 8 wherein the processor displays the travel route on a display of the user interface along with the alert.

* * * * *